United States Patent
Horton et al.

(10) Patent No.: US 8,805,330 B1
(45) Date of Patent: Aug. 12, 2014

(54) AUDIO PHONE NUMBER CAPTURE, CONVERSION, AND USE

(75) Inventors: Brita A. Horton, Olathe, KS (US); Sanjay K. Sharma, Olathe, KS (US); Kenneth R. Steele, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 634 days.

(21) Appl. No.: 12/938,574

(22) Filed: Nov. 3, 2010

(51) Int. Cl.
 *H04M 1/725* (2006.01)
 *H04M 3/533* (2006.01)
 *H04M 3/537* (2006.01)
 *H04W 4/12* (2009.01)
 *H04W 4/16* (2009.01)
 *H04L 12/58* (2006.01)

(52) U.S. Cl.
 CPC .......... *H04M 3/53333* (2013.01); *H04M 3/533* (2013.01); *H04M 3/537* (2013.01); *H04M 1/7255* (2013.01); *H04W 4/12* (2013.01); *H04W 4/16* (2013.01); *H04L 12/5895* (2013.01)
 USPC ..................... 455/412.1; 455/412.2; 455/413; 455/418; 455/419; 379/88.01; 379/88.08; 379/88.09; 379/88.12; 379/88.14; 379/88.16; 379/88.13

(58) Field of Classification Search
 CPC . H04M 3/53333; H04M 3/537; H04M 3/533; H04M 1/7255; H04M 2201/40; H04M 2203/4536; H04W 4/12; H04W 4/16; H04L 12/5895
 USPC ........ 455/412.1–412.2, 413, 414.4, 418, 419; 379/88.01, 88.08, 88.09, 88.12, 88.13, 379/88.14, 88.16
 See application file for complete search history.

(56) References Cited

U.S. PATENT DOCUMENTS

| | | | |
|---|---|---|---|
| 6,570,964 B1 * | 5/2003 | Murveit et al. | 379/67.1 |
| 6,785,367 B2 * | 8/2004 | Horvath et al. | 379/88.04 |
| 6,970,906 B1 * | 11/2005 | Parsons et al. | 709/204 |
| 7,251,313 B1 * | 7/2007 | Miller et al. | 379/88.01 |
| 8,077,839 B2 * | 12/2011 | Yasko | 379/88.16 |
| 2003/0190020 A1 | 10/2003 | Kitchings | |
| 2004/0264667 A1 * | 12/2004 | Hu | 379/210.01 |
| 2007/0047702 A1 * | 3/2007 | Newell et al. | 379/101.01 |
| 2008/0188204 A1 * | 8/2008 | Gavner | 455/413 |
| 2008/0226041 A1 * | 9/2008 | Ramamoorthy et al. | 379/88.01 |
| 2008/0312928 A1 * | 12/2008 | Goebel et al. | 704/255 |
| 2009/0060156 A1 | 3/2009 | Burckart et al. | |
| 2009/0061827 A1 * | 3/2009 | Bulgin et al. | 455/413 |
| 2009/0299743 A1 * | 12/2009 | Rogers | 704/235 |

\* cited by examiner

*Primary Examiner* — Olumide T Ajibade Akonai

(57) ABSTRACT

A portable electronic device is provided. The portable electronic device comprises a processor, a memory, and a capturing application stored in the memory that, when executed on the portable electronic device, monitors a first voice telephone call with a first transmitting device. The portable electronic device also comprises records a telephone number spoken during the first voice telephone call. The portable electronic device also comprises sends a first message to the first transmitting device, the first message containing the telephone number and requesting confirmation of the telephone number. The portable electronic device comprises receives a second message from the first transmitting device, the second message confirming the telephone number.

20 Claims, 6 Drawing Sheets

AUDIO PHONE NUMBER CAPTURE, CONVERSION, AND USE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Telephone messaging may be services provided by a person or agency that handles the process of taking and delivering messages for a person or business. Voicemail systems are designed to convey a recorded audio message to a recipient. Such services may utilize private branch exchanges (PBX) or software solutions in order to handle multiple calls and clients. Organizations wishing to effectively manage their phone messaging may become burdened with overly complex, expensive software solutions. "Virtual phone message pad" products archive phone messages and may create a phonebook for each user. Some solutions use instant messaging applications, spreadsheet-style applications, and server-based applications that require users to log in through their computers or telephones. Other solutions may allow users to access their telephone messages via the Internet or other network and provide users with telephone message notifications transmitted using electronic mail, short message service (SMS) text, or other messaging tools. Software solutions commonly integrate phone switches, including private branch exchanges (PBX) with traditional computer databases that may store phone message and contact information.

SUMMARY

In an embodiment, a portable electronic device is provided. The portable electronic device comprises a processor, a memory, and a capturing application stored in the memory that, when executed on the portable electronic device, monitors a first voice telephone call with a first transmitting device. The portable electronic device also records a telephone number spoken during the first voice telephone call. The portable electronic device also sends a first message to the first transmitting device, the first message containing the telephone number and requesting confirmation of the telephone number. The portable electronic device receives a second message from the first transmitting device, the second message confirming the telephone number.

In an embodiment, a processor-implemented method is provided. The method comprises a portable electronic device receiving at least one of a spoken input and a keypad input during the playing of a voice mail message. The method also comprises the portable electronic device parsing the voice mail message and identifying at least one telephone number spoken in the voice mail message. When a plurality of telephone numbers are spoken during the voice mail message, the method also comprises the portable electronic device identifying the last telephone number spoken prior to the receipt of the at least one spoken input and keypad entry. The method also comprises the portable electronic device converting the last telephone number to text format and storing the last telephone number in the text format.

In an embodiment, a processor-implemented method is provided. The method comprises a portable electronic device receiving at least one of a spoken entry and a keypad entry, the at least one entry activating a capturing application executing on the portable electronic device. The method also comprises the capturing application recording a telephone number spoken into the first portable electronic device during a voice telephone call with a first recipient. The method also comprises the capturing application converting the telephone number to a text format and storing the converted telephone number. The method also comprises the capturing application confirming the telephone number in the text format with the user of the first portable electronic device. The method also comprises the capturing application sending a message to the first recipient, the message containing the confirmed telephone number in the text format.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
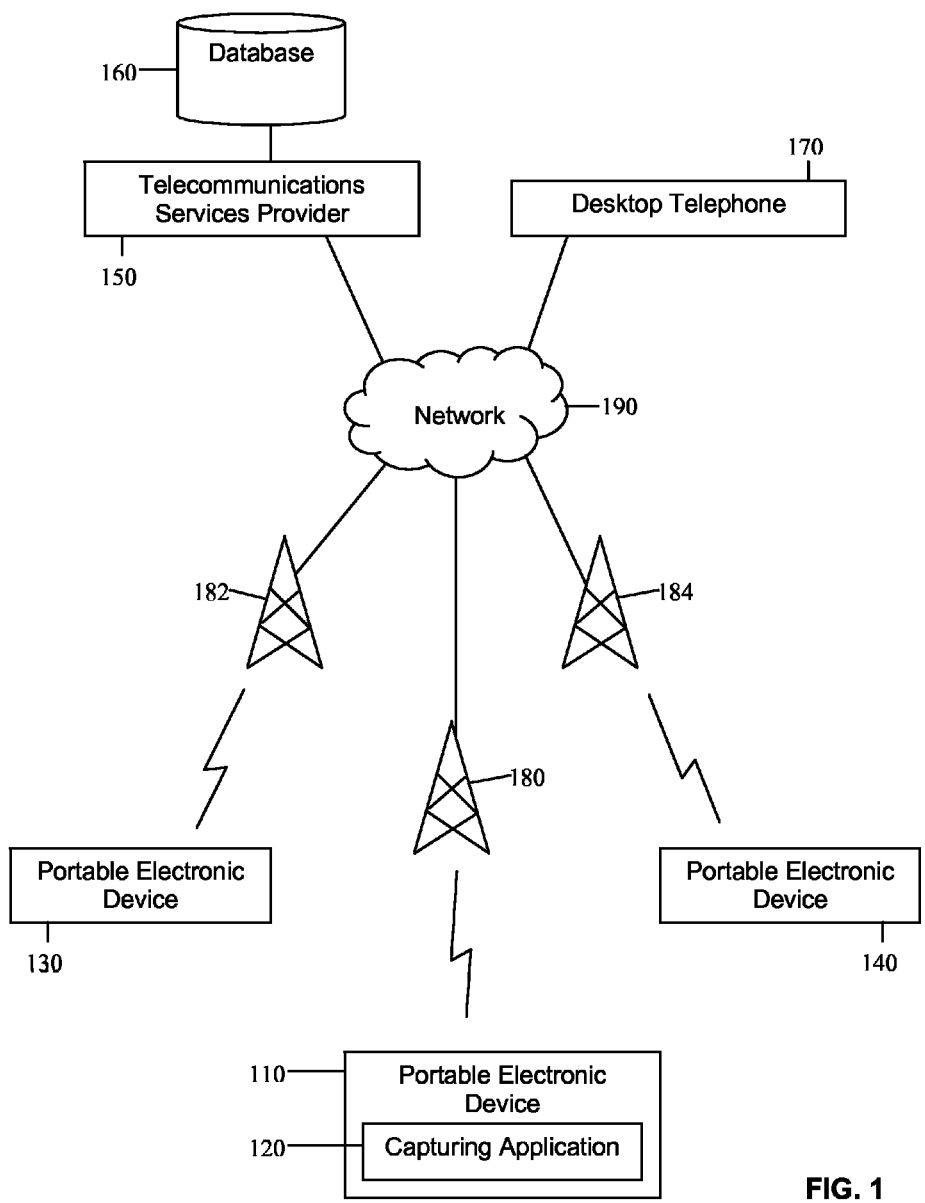
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides a system and methods of phone number capture, conversion, and use that monitor portions of voice telephone conversations and capture and analyze segments of the audio content wherein strings of numbers may be spoken. A capturing application executing on a portable electronic device may record, analyze, and interpret some of the spoken numeric strings as telephone numbers and provide the telephone numbers in human-readable text or other format in a message to the party to whom the number was spoken. The application may confirm the telephone number with the party who spoke the number and provide the party the means to change the recorded number if not correctly interpreted by the application. The application may not deliver the message containing the telephone number to the party to whom the number was spoken until the speaking party confirms the number as correct.

The system allows the user of the device executing the capturing application to receive a telephone number confirmed by the speaker of the telephone number as accurate. The user of the device may be alleviated of the task of recording the number or the distraction of trying to memorize the number. The user may be driving an automobile or otherwise unable to accurately record or retain the telephone number provided by the speaking party. The user may find it inconvenient or unsafe to manually record a phone number and may be unable to memorize and retain the phone number if distracted while driving or otherwise occupied. The user may be relieved of having to ask the speaker to repeat the spoken phone number, thereby not interrupting the conversation. Both parties may be provided safety, convenience, and non-interruption by the system and methods taught herein.

The system conversely may promote the user of the portable electronic device executing the capturing application to speak a telephone number wherein a segment of the audio content is similarly analyzed and the spoken number extracted. The spoken number is then sent to the listening party in text or other format, relieving that party of recording or memorizing the spoken phone number. The system also may process a voice mail message received by the user of the device. The system may interpret some strings of spoken or other audible sounds in recorded voice mail messages as telephone numbers and save the numbers in text or other format. The user may later access a selectable option causing an outgoing call to be initiated to the saved telephone number. The saved number may be added to a contacts list with name and other contact information later added by the user.

Turning now to FIG. 1, a system 100 of audio phone number capture, conversion, and use is provided. The system 100 comprises portable electronic devices 110, 130, 140, a capturing application 120, a telecommunications services provider 150, a database 160, a desktop telephone 170, base transceiver stations (BTS) 180, 182, 184, and a network 190.

The capturing application 120 executes on the portable electronic device 110. In an embodiment, portable electronic devices 110, 130, 140 may be a mobile phone, a personal digital assistant, a media player, or other electronic device. Mobile telephones are described in detail hereinafter. The capturing application 120, upon activation, may monitor voice telephone calls in which the portable electronic device 110 is a participant. During a call, the capturing application 120, after activation, may listen for the speaking of telephone numbers by other parties to the call. When a telephone number is spoken by one of the other parties, the capturing application 120 may capture a portion of the audio content during which the telephone number may have been spoken. The capturing application 120 then analyzes the captured portion of audio content and may identify the spoken string of numbers as a telephone number. The recording application 120 may store the portion of audio content containing the spoken telephone number and may convert the audio content to a string of numeric characters in text or other format. In an embodiment, the capturing application 120 may not store the audio content and may store only the numeric values for the telephone number converted from the audio content. The capturing application 120 may confirm the accuracy of the spoken telephone number with the other party who provided it. When confirmed, the capturing application 120 stores the information containing the spoken telephone number for the user of the portable electronic device 110 to later access and use in placing an outgoing call to the telephone number.

The capturing application 120 may relieve the user of the portable electronic device 110 of the tasks of memorizing, manually noting, or otherwise making a record of a telephone number verbally provided by another party during a phone conversation. While engaged in a conversation on the portable electronic device 110 and simultaneously driving an automobile or otherwise occupied or distracted, it may be inconvenient, impractical, or unsafe for the user to attempt to record or memorize verbally received information, for example a telephone number. The user may record the telephone number provided by the other party incorrectly. The user may memorize the telephone number but then become distracted and forget the number. The present disclosure teaches the user of the portable electronic device 110, before or during a phone conversation, activating the capturing application 120 using a key sequence, using a spoken command, or using another method. The capturing application 120 then monitors the voice transmissions during the phone conversation. When the capturing application 120 detects that one of the parties to the call speaks a numeric string that the capturing application 120 determines to be a telephone number, the capturing application 120 captures the portion of audio containing the spoken numeric string. The capturing application 120 may convert the spoken numeric string to human-readable text or other format and save the numeric string in the text or other format. The user may later, at the user's convenience, access the saved text-converted telephone number and place a call using the number. The user is alleviated of the task of writing down, memorizing, or otherwise trying to capture the spoken telephone number during the phone conversation. With a simple key entry, for example, the user may cause the capturing application 120 to activate and secure a record of a spoken phone number provided in the conversation. The user, with a key entry or other action, also may deactivate the capturing application 120. Additionally, the party providing the phone number is alleviated of the potential need to repeat the number and the conversation is not interrupted.

The present disclosure teaches embodiments of the capturing application 120 providing additional functionality. Upon storing the converted numeric string in text or other format, the capturing application 120 may send a message to the other party who spoke the number requesting the other party to confirm the number. The other party may send a reply message during or after the telephone call that the spoken number was captured correctly or may provide a corrected number. In another application of the components provided herein, the capturing application 120 may monitor the voice transmissions generated by the user of the portable electronic device 110 on which the capturing application 120 is executing. When the capturing application 120 determines that the user has spoken or is speaking a telephone number or when the capturing application 120 is triggered or alerted that the user is about to speak a telephone number, the capturing application 120 may capture a portion of the audio content containing the spoken number. The capturing application 120 then may send the information to the party to whom the user is speaking. The telephone number spoken by the user of the portable electronic device 110 may be converted to text or other format and sent in a short message service (SMS) message or other type of message to the party to whom the user spoke the telephone number. In another application of the teachings of the present disclosure, the capturing application 120 may process a voice mail message received by the portable electronic device 110, extract a spoken phone number from the message, and save it for the user's reference. In an embodiment, the capturing application 120 may convert the spoken phone number to a human-readable format, perhaps a text format, and may save the converted information in a contacts list accessible by the user. In an embodiment, the spoken number may not be converted to a human-readable format and may instead be stored in another format and represented in a contacts list by a contact name. When the user of the portable electronic device 110 highlights or otherwise selects the stored contact name and invokes an instruction to place a call to the contact, the stored telephone number linked to the contact name is accessed from storage and dialed.

Before or during a phone conversation, the user of the portable electronic device 110 may activate the capturing application 120 by entering a key sequence into the keypad entry, by speaking a command into the portable electronic device 110, or by another method. The capturing application 120 may monitor the phone conversation and record and analyze portions of the conversation while the conversation is ongoing and after the conversation is concluded. The capturing application 120 may listen for the speaking of sequences of numbers by one of the parties to the call wherein the spoken sequences of numbers may be telephone numbers. The capturing application 120 may determine that the spoken numbers may be a telephone number because the sequence of numbers is seven or ten digits in length, lengths that correspond with the dial plan used by the North American public switched telephone network (PSTN). The capturing application 120 also may record and analyze spoken sequences of numbers of other lengths that may correspond to dial plans used in geographic regions outside North America. The capturing application 120 may listen for the speaking of specific digit sequences such as 011 used in North America to initiate telephone calls to recipients outside North America or the digit 1 followed by ten digits that may indicate a long distance call in North America. The capturing application 120 may listen for spoken sequences of digits of other lengths that may indicate internal extensions used inside of an organization's private telephone network managed by a private branch exchange (PBX). The capturing application 120 may be configured to recognize predetermined lengths of digits or combinations of specific digits, such as specific three digit strings used as area codes in North America or country codes or city codes used in some locales outside North America.

The capturing application 120 also may recognize some spoken words in telephone conversations that may be associated with spoken telephone numbers. The capturing application 120 may be alerted to record and analyze captured portions of audio content when it detects the speaking of the words "telephone number" or "phone number", for example. When these words or other predefined words are detected to be spoken, the capturing application 120 may be configured to automatically record, analyze, and store the following ten or twenty seconds of the telephone conversation, for example.

When the capturing application 120 isolates a portion of audio content from a telephone conversation that it determines may contain a spoken telephone number, it may store the portion of audio content either locally in the portable electronic device 110 or in a remote storage device, for example the database 160 associated with the telecommunications services provider 150. In an embodiment, the capturing application 120 may convert the portion of audio content containing the spoken string of numbers to human-readable format and save the character string in that format. The capturing application 120 may convert the numbers to text format using one of enriched text, formatted text, plain text, or another encoding method. When converting to plain text, the characters may be encoded using the American Standard Code for Information Interchange (ASCII) scheme or one of its derivatives.

In an embodiment, the capturing application 120 may store the captured telephone number momentarily or may not store the captured telephone number at all. The capturing application 120 instead may make the captured telephone number available for the user of the portable electronic device 110 to dial immediately upon hearing it spoken in a voice message. If the user of the portable electronic device hears the telephone number of interest spoken during a live telephone conversation, the user may cause the capturing application 120 to immediately instantiate a new outgoing call to that spoken phone number on a second or other line while the first call is still ongoing. The spoken number effectively may not be stored or only stored briefly while the capturing application 120 is causing the spoken number to be dialed on the second or other line. Whether the user of the portable electronic device 110 hears the spoken telephone number in a voicemail or other message or hears it spoken in a live conversation, upon instruction by the user the capturing application 120 may place the captured telephone number into a visual or audible interface that the user then may access to cause the spoken telephone number to be dialed on a virtually immediate basis. In this instance, the captured telephone number only may be stored for the brief duration of time needed for the captured number to be dialed.

Alternatively, the spoken number may be presented in a window of a user interface of the portable electronic device 110 after it has been captured. After completion of the ongoing call, the user of the portable electronic device 110 may select the captured number displayed in the window of the user interface to place a phone call to the subject number. When the window of the user interface of the portable electronic device 110 is exited, the spoken number may be lost because it is otherwise not stored on the portable electronic device 110.

The capturing application 120 may distinguish between telephone numbers spoken by the user of the portable electronic device 110 and those spoken by other parties to the telephone call. When a telephone number is spoken by a party other than the user, the capturing application 120 may determine that the captured audio segment contains a telephone number. The capturing application 120 then may convert the number to human-readable text or other format. In an embodiment, the capturing application 120 may save the converted number and prompt the user to enter a key sequence or provide a voice instruction causing the portable electronic device 110 to dial the converted number. In another embodiment, the capturing application 120 may cause a message to be provided to the user, for example an electronic mail message, short message service (SMS) message, hereinafter referred to as a text message, or message provided using another application. The message provided to the user may contain the telephone number converted into a human-readable text format.

The user can read the phone number from the electronic mail or text message and manually enter the phone number into the keypad of the portable electronic device 110 and initiate the call. In an embodiment, the electronic mail or text message may contain a selectable button, link, or other object that the user may invoke or activate that causes the portable electronic device 110 to dial the displayed phone number. The electronic mail or text message may alternatively or in addition contain or be associated with functionality that promotes the user causing the portable electronic device 110 to dial the displayed phone number by using a voice command. The electronic mail message, text message, or other message also may contain a date stamp and time stamp associated with the date and time of the phone call in which the telephone number was spoken. It may contain the name of the person who spoke the phone number in the recorded audio portion, the speaker's own telephone number, and other identifying information about the speaker.

The present disclosure also teaches a confirmation process to engage the speaker of the telephone number during or after the telephone call. This process may give the speaker of the telephone number an opportunity to review the phone number the speaker provided, confirm it if correct, and change it if incorrect. When the capturing application 120 monitors the telephone call and identifies and captures a portion of audio content that contains a spoken phone number, before providing it to the user of the portable electronic device 110, the capturing application 120 may send an electronic mail, text, or other message to the party who spoke the phone number. When the message requesting confirmation is delivered, the party may be prompted to respond with an audible, visual, and/or vibratory alert. This action may occur during the phone conversation or after it has concluded. The message may provide the spoken phone number in text or other human-readable format, and the message may request the party to review the number to ensure its accuracy. The party may be given the option to confirm that the number in the message matches the number that the party spoke earlier in the phone conversation. The party may confirm the number in a plurality of manners, for example by selecting an icon, link, or other selectable object appearing in the electronic mail, text, or other message from the capturing application 120.

In an embodiment, the confirmation message to the party who spoke the phone number may be audible, and the party may respond audibly or in another manner. For example, the capturing application 120, instead of or in addition to converting the spoken phone number extracted from the audio content into a text or other human-readable format, may convert the spoken phone number into an audible format using a mechanically generated voice that recites the spoken number as interpreted by the capturing application 120. The recited phone number sounded using the mechanically generated voice may be accompanied by an audible request in the same or another voice requesting the party to confirm the telephone number. The party may confirm that the number provided in the confirmation message received is correct, whereupon the capturing application 120 may send a message to the user of the portable electronic device 110 using electronic mail, text, or other method confirming the telephone number provided earlier during the telephone call.

When the capturing application 120 provides the recorded and interpreted phone number to the party who spoke the number, that party may determine that the phone number as captured is incorrect. In an example, the portable electronic device 130 and the portable electronic device 110 may be engaged in a voice session, and during the conversation the user of the portable electronic device 130 may provide a telephone number of a third party to the user of the portable electronic device 110. The capturing application 120 executing on the portable electronic device 110 may record and apply voice recognition techniques to segments of the conversation and may focus on portions of the conversation spoken by the user of the portable electronic device 130. The capturing application 120 may determine that a numeric string transmitted by the portable electronic device 130 comprises a telephone number. The capturing application 120 may generate a telephone call to the portable electronic device 130 providing the phone number in a mechanical voice and request the user of the portable electronic device 130 to reply with a voice command or key stroke if the number being confirmed is correct or incorrect. If incorrect, the user may provide the correct number audibly by voice or may enter the correct number using the keypad. If the capturing application 120 provides the confirmation message to the portable electronic device 130 using electronic mail or text messaging, the message may display the telephone number interpreted by the capturing application 120. If incorrect, the user of the portable electronic device 130 may provide the correct number by sending a reply electronic mail or text message containing the correct number. The electronic mail or text message alternatively may allow the user of the portable electronic device 130 to call into or otherwise contact a service center and verbally or through keypad entry provide the correct number.

The portable electronic device 110 executing the capturing application 120 may have a subscription account for wireless services with the telecommunications services provider 150. In an embodiment the capturing application 120 may interact with components associated with or in the control of the telecommunications services provider 150. The capturing application 120 may interact with the database 160 associated with the telecommunications services provider 150, for example, when the capturing application 120 is monitoring telephone conversations, temporarily storing portions of audio content during analysis, and storing files containing spoken telephone numbers that may have been converted to text or other format. Since the portable electronic device 110 may have limited storage capacity, the capturing application 120 may store some of the captured and processed media in the database 160. The portable electronic device 110, as part of its wireless subscription arrangement with the telecommunications services provider 150, may be associated with a voice mail services account wherein messages are stored in the database 160 or in another device associated with the telecommunications services provider 150. When the capturing application 120 is transmitting media between the portable electronic device 110 and other devices such as the portable electronic devices 130, 140 or the desktop telephone 170 that may be parties to voice conversations with the portable electronic device 110, it may be feasible for the capturing application 120 to store the transmitted media in the database 160. The capturing application 120 also may perform some of its actions using the processing capabilities and infrastructure of the telecommunications services provider 150. When the other portable electronic devices 130, 140 or the desktop telephone 170 may maintain subscription accounts, including voice mail services, with the telecommunications services provider 150, the capturing application 120 may cause the telecommunications services provider 150 to interact with those subscription accounts to assist in delivering messages containing information about telephone numbers spoken during voice calls.

The capturing application 120 may assist the user of the portable electronic device 110 in providing telephone numbers as well as receiving spoken and confirmed telephone numbers. While the capturing application 120 may detect the speaking of a telephone number by another portable electronic device 130, 140 or the desktop telephone 170, the capturing application 120 also may detect the speaking of a telephone number by the user of the portable electronic device 110. When this occurs, the capturing application 120 may capture and analyze the portion of the spoken audio content wherein a numeric string is detected to have been spoken. If the capturing application 120 determines after analysis that the spoken numeric string comprises a telephone number, the capturing application 120 may convert the numeric string to human-readable text or other format. The capturing application 120 then may send the converted numeric string to the portable electronic device 130, 140, the desktop telephone 170, or other participant in an electronic mail message or text message.

The capturing application 120 may send the information in audible format in a voice mail message, voice telephone call, or other method. In an embodiment, the capturing application 120 may engage the user in a confirmation process similar to the manner described previously when a call participant other than the user of the portable electronic device 110 speaks a telephone number. In the embodiment, after the user of the portable electronic device 110 speaks a phone number, the capturing application 120 may request the user to confirm it before sending it to the portable electronic device 130, 140, the desktop telephone 170, or other call participant to whom the spoken telephone number was directed. The portable electronic device 110 may receive an electronic mail message, text message, voice mail message, voice call, or other message that provides the number as interpreted by the capturing application 120 and request confirmation by the user of the portable electronic device 110. The user may be prompted to respond by the portable electronic device 110 via an audible, visual, and/or vibratory alert. The user may utilize a plurality of methods to confirm the interpreted spoken telephone number as correct or change it if not interpreted correctly by the capturing application 120. The confirmed or corrected telephone number then may be provided by the capturing application 120 to the portable electronic device 130, 140, the desktop telephone 170, or other call participant to whom the spoken telephone number was directed.

In an embodiment, the portable electronic devices 110. 130, 140, the desktop telephone 170, or other call participant may not be able to receive electronic mail messages, text messages, or other messages containing confirmed telephone numbers, containing requests to confirm spoken telephone numbers, or containing other requests or information associated with the present disclosure. For example, the desktop telephone 170 may be unable to access telecommunications services that depend on text messaging. In such cases, the capturing application 120 may detect this condition and send the information in a voice message or in an electronic mail message with an electronic mail address known to be associated with the desktop telephone 170.

In addition to capturing segments of audio from live telephone calls, extracting spoken numeric strings, and delivering the numbers confirmed as telephone numbers, the capturing application 120 also may analyze voice mail messages received by the portable electronic device 110 to perform similar tasks. When a caller leaves a voice mail message for the portable electronic device 110, the caller may speak a telephone number in the message. The caller, for example, may be providing a telephone number for a third party to the user of the portable electronic device 110 with a request for the user to call the third party. The user of the portable electronic device 110, for example, may be driving an automobile at the time the voice mail message is received and may wish to place the requested call to the third party while still driving. While listening to the voice mail message, the user may hear a spoken telephone number. The user may enter a key sequence, provide a voice command, or take another action that causes the capturing application 120 to effectively "back up" a predetermined number of seconds, for example, in the voice mail message, capture a section of audio that it had just played, and perform its analysis as previously described to determine that a numeric string in the voice mail message is a telephone number. The capturing application 120 then may provide the telephone number to the user in an electronic mail message, a text message, or an audible message. The message may include an icon, link, or other selectable object or control that may be activated with a manual action or verbal command that initiates an outgoing call to the telephone number. The user of the portable electronic device 110 may place the outgoing call to the telephone number in the voice mail message with a minimum of distraction, promoting safety for the user.

When the user of the portable electronic device 110 is listening to a voice mail message that contains a plurality of spoken numeric sequences that may comprise telephone numbers, the capturing application 120 may be configured to analyze only the last numeric sequence in the audio content before the user requested capture. In an embodiment, the user may listen to an extended voice mail message in which a plurality of telephone numbers is spoken. In an example, the user may already know all but one of the spoken telephone numbers. The user may listen to the voice mail message and wait until the one unknown telephone number is spoken. The user may then, for example, enter a key sequence that causes the capturing application 120 to activate, effectively "back up" the voice mail message, and record the last numeric sequence spoken.

The capturing application 120 also may perform processing of received voice mail messages under other circumstances, such as during times when the user of the portable electronic device 110 is not listening to a voice mail message. The capturing application 120 may, on a predetermined schedule, process saved voice mail messages, search for portions of saved audio content wherein numeric strings are spoken, and determine that the numeric strings comprise telephone numbers. The capturing application 120 may then create electronic mail messages, text messages, or audible messages to the portable electronic device 110 containing the telephone number that provide the user of the portable electronic device 110 the opportunity to save or discard the telephone number. The telephone number also may be accompanied by other information such as the date and time of the voice mail message, a name that may be associated with the spoken telephone number, and the telephone number and name, if known, of the party that left the voice mail message containing the spoken telephone number. The capturing application 120 also may provide an opportunity for the user of the portable electronic device 110 to save the captured information in a contacts list.

In an embodiment, the capturing application 120 may capture a plurality of spoken telephone numbers from a single voice mail message and provide the telephone numbers in a single or multiple electronic mail messages, text messages, or audible messages to the user of the portable electronic device 110. The messages may contain tags or other software objects to which the user may apply names and other information to each telephone number such that each may be stored in a contacts list.

The present disclosure also teaches the capturing application 120 using policies to take certain actions described herein. The capturing application 120, for example, may observe a policy wherein it does not record and analyze audio content from some portable electronic devices 130, 140 or desktop telephones 170. Such policies may be effective at all times or during predetermined times or on predetermined days. The capturing application 120 also, may for example, observe policies about confirming spoken telephone numbers with some predetermined callers in a defined manner. The user of the portable electronic device 140 may, for example, request that messages requesting confirmation of telephone numbers spoken by the user be provided in text messages only and be delivered after, and not during, the conversation in which the telephone number was spoken has been completed. The capturing application 120 may be configured in a plurality of manners to apply policies regarding preferences expressed by the users of the portable electronic devices 110, 130, 140, the desktop telephone 170, or other call participants. The capturing application 120 may be subject to policies placed into effect due to legal regulations mandated by relevant jurisdictions regarding privacy, confidentiality, and security. Because the capturing application 120 may be used to record portions of international telephone calls, legal regulations of sovereign bodies outside the United States may impose limitations on the actions of the components of the system 100. In an embodiment, policies to which the portable electronic device 110 is subject in its use of the capturing application 120 may be stored in the database 170 or other device associated with the telecommunications services provider 150. The capturing application 120 may consult such policies before recording portions of some telephone conversations.

The capturing application 120 additionally may be used in applications not involving an ongoing telephone conversation or a received voice mail message. The user of the portable electronic device 110 may invoke the capturing application 120 in private to verbally record a telephone number. The user may be the only individual present with the portable electronic device 110 or may be in a group, may activate the capturing application 120, and may speak a telephone number into the portable electronic device 110. The capturing application 120 may analyze the audio contact and extract and render and store the spoken telephone number in text or other format on the portable electronic device 110 or elsewhere. The medium in which the extracted telephone number is placed, for example a text message, may include a selectable icon, link, or other object or audible queue that may be activated, causing a call to the extracted telephone number to be initiated. At a time and place of the user's choice, the user may draw the message from storage and initiate a telephone call using the stored telephone number. The user may alternatively send the message to another party, for example the portable electronic device 140, for the user of that device to initiate a call using the stored telephone number.

The capturing application 120 may interact with a calendaring and alerting function of the portable electronic device 110 to prompt the user of the portable electronic device 110 to call a stored telephone number obtained by the capturing application 120. The user may cause the capturing application 120 to record a telephone number as described immediately above or the capturing application 120 may capture a telephone number from a live conversation or from a stored voice mail message as described comprehensively herein. In each of these instances, the user may access a calendaring and alerting function and may cause an alert to be associated with the message created and stored by the capturing application 120 that contains a telephone number extracted by the capturing application 120. When the day and time associated with the stored message is reached, the alert may be activated. The user of the portable electronic device 110, 130, 140, desktop telephone 170, or other device to which the message containing the captured telephone number and other information is sent is prompted by the alert to call the telephone number in the message.

The capturing application 120 may be configured to work in conjunction with some voice recognition software such that the voices and speaking manners of the user of the portable electronic device 110 or other portable electronic devices 130, 140, the desktop telephone 170, or other devices may be learned and more readily recognized. This capability may promote the capturing application 120 to more accurately process captured segments of telephone conversations. In an embodiment, the capturing application 120 may be configured to adapt to spoken accents or some spoken languages in addition to English, for example.

The portable electronic device 110, 130, 140 may be a mobile telephone, a media player, or a personal digital assistant (PDA). The portable electronic device 110 may be a tablet computer or a laptop computer equipped with hardware and software providing voice telephony capability.

The base transceiver stations (BTS) 180, 182, 184 may be any of a cellular wireless base transceiver station, for example a Code Division Multiple Access (CDMA), Global System for Mobile Communications (GSM), Universal Mobile Communications System (UMTS), and/or Long-term Evolution (LTE) cellular wireless base transceiver station; a World-wide Interoperable Microwave Access (WiMAX) base transceiver station; a WiFi access point; a femtocell; or other wireless access devices.

The network 190 promotes communication between the components of the system 100. The network 190 may be any communication network including a public data network (PDN), a public switched telephone network (PSTN), a private network, and/or a combination thereof.

Figure 2:
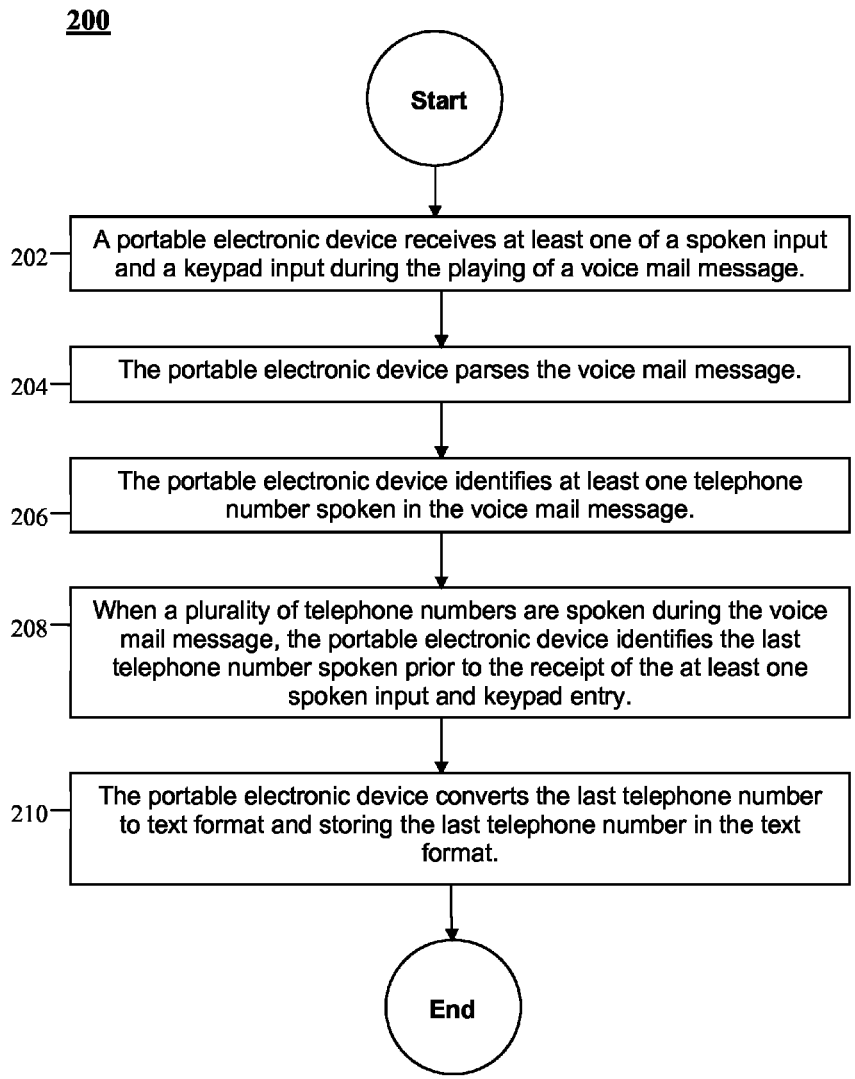
FIG. 2 is a flow chart illustrating a method according to an embodiment of the disclosure.

Turning now to FIG. 2, a processor-implemented method 200 is provided. Beginning at block 202, a portable electronic device receives at least one of a spoken input and a keypad input during the playing of a voice mail message. At block 204, the portable electronic device parses the voice mail message.

At block 206, the portable electronic device identifies at least one telephone number spoken in the voice mail message. When a plurality of telephone numbers are spoken during the voice mail message, at block 208 the portable electronic device identifies the last telephone number spoken prior to the receipt of the at least one spoken input and keypad entry. At block 210, The portable electronic device converts the last telephone number to text format and storing the last telephone number in the text format.

Figure 3:
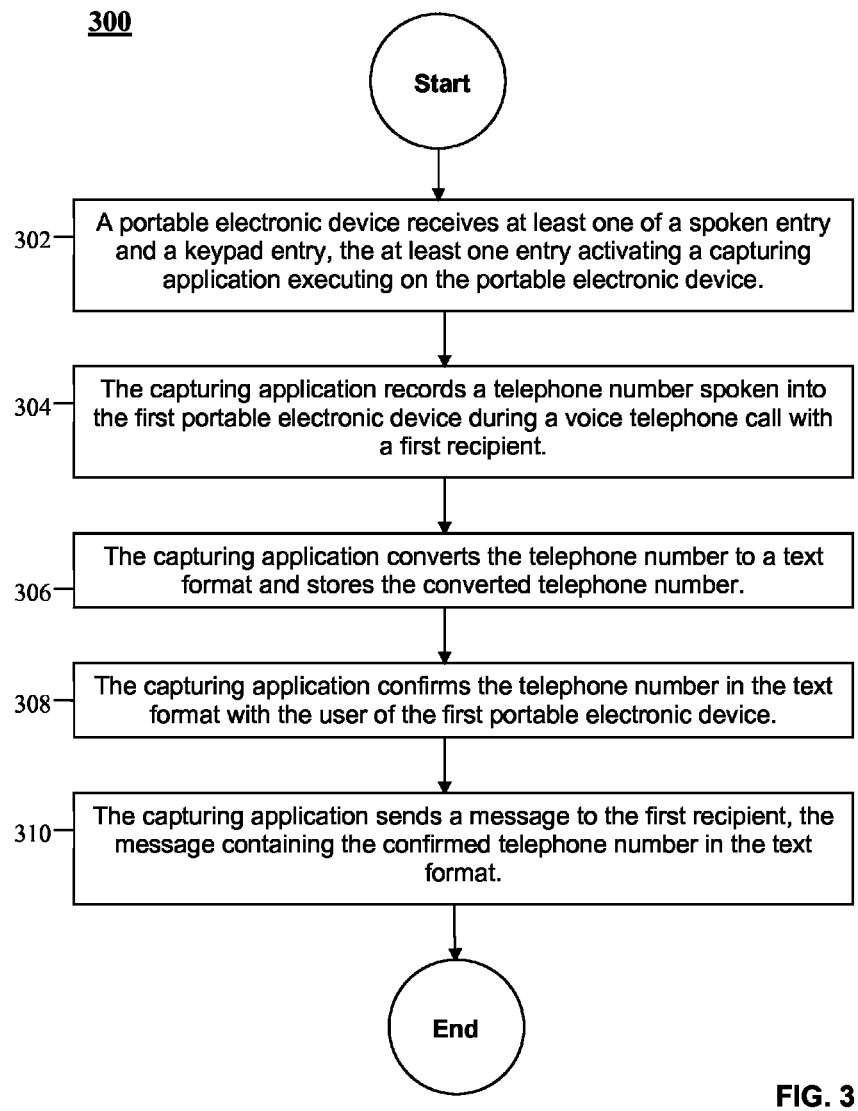
FIG. 3 is a flow chart illustrating a method according to an embodiment of the disclosure.

Turning now to FIG. 3, a processor-implemented method 300 is provided. Beginning at block 302, a portable electronic device receives at least one of a spoken entry and a keypad entry, the at least one entry activating a capturing application executing on the portable electronic device. At block 304, the capturing application records a telephone number spoken into the first portable electronic device during a voice telephone call with a first recipient.

At block 306, the capturing application converts the telephone number to a text format and stores the converted telephone number. At block 308, the capturing application confirms the telephone number in the text format with the user of the first portable electronic device. At block 310, the capturing application sends a message to the first recipient, the message containing the confirmed telephone number in the text format.

Figure 4:
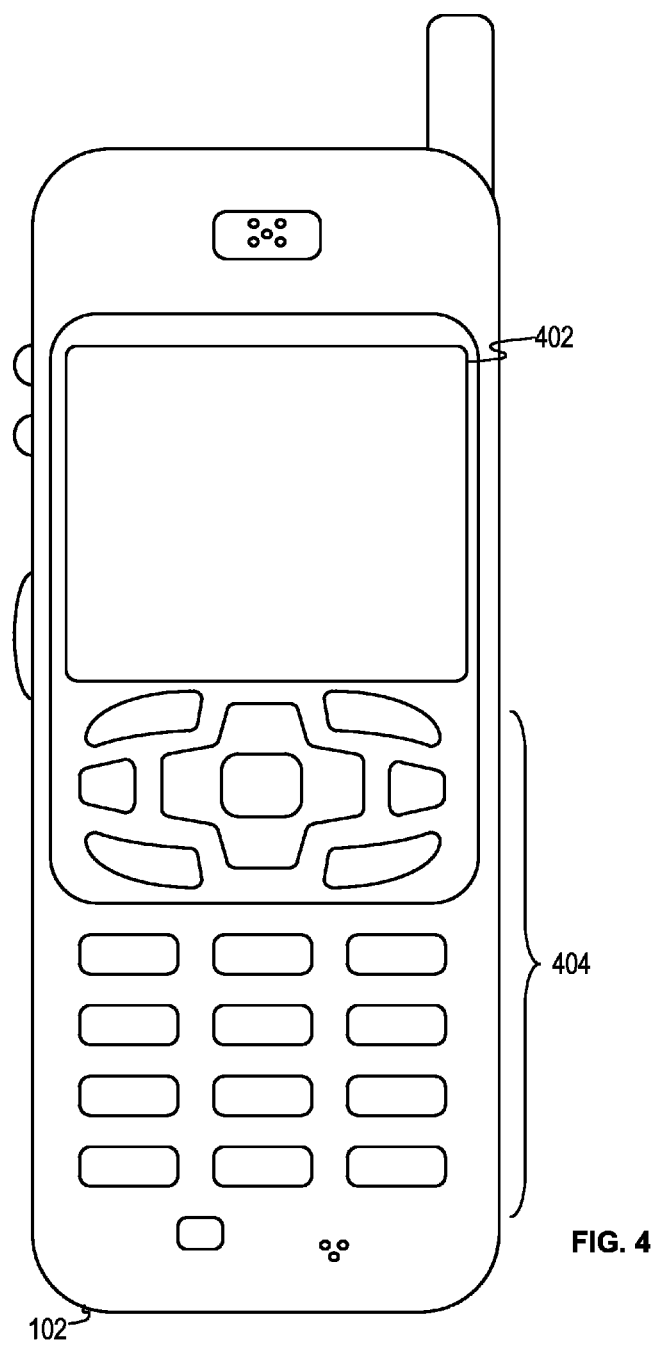
FIG. 4 is an illustration of a mobile device according to an embodiment of the disclosure.

FIG. 4 shows a wireless communications system including the mobile device 102. FIG. 4 depicts the mobile device 102, which is operable for implementing aspects of the present disclosure, but the present disclosure should not be limited to these implementations. The mobile device 102 in some embodiments may exemplify the portable electronic device 110 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface and/or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 402 to show a web page. The web page may be obtained via wireless communications with the base transceiver stations (BTS) 180, 182, 184, a wireless network access node, a peer mobile device 102 or any other wireless communication network or system. In some instances, the mobile device 102 may be in communication with multiple base transceiver stations (BTS) 180, 182, 184 at the same time. The base transceiver stations (BTS) 180, 182, 184 (or wireless network access node) may be coupled to a wired network, such as the Internet. Via the wireless link and the wired network, the mobile device 102 has access to information on various servers. The servers may provide content that may be shown on the display 402. Alternately, the mobile device 102 may access the base transceiver stations (BTS) 180, 182, 184 through a peer mobile device 102 acting as an intermediary, in a relay type or hop type of connection.

Figure 5:
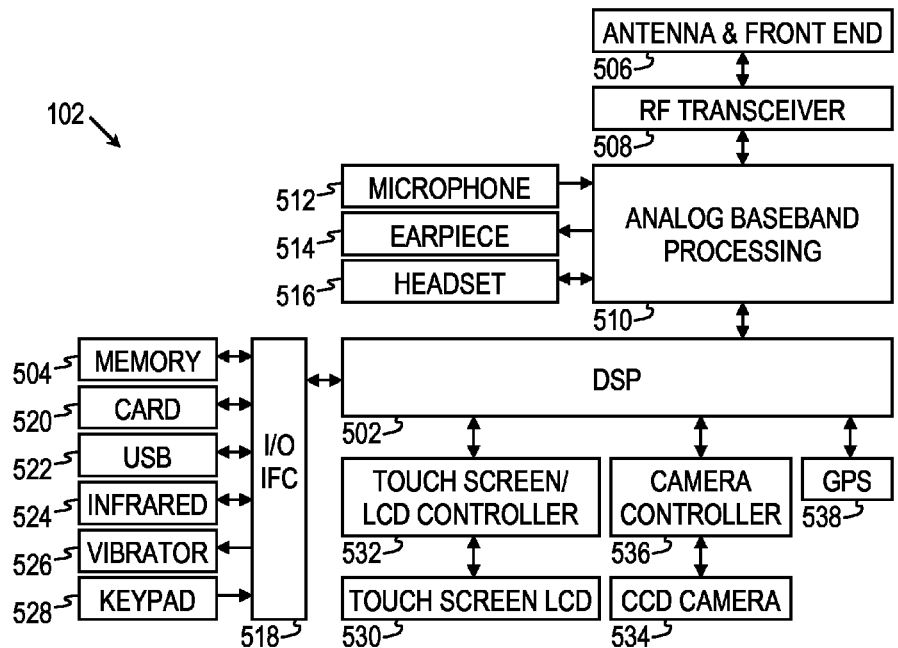
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 further may connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which also may display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals also may be included to provide additional functions, e.g., radio and television reception.

Figure 6:
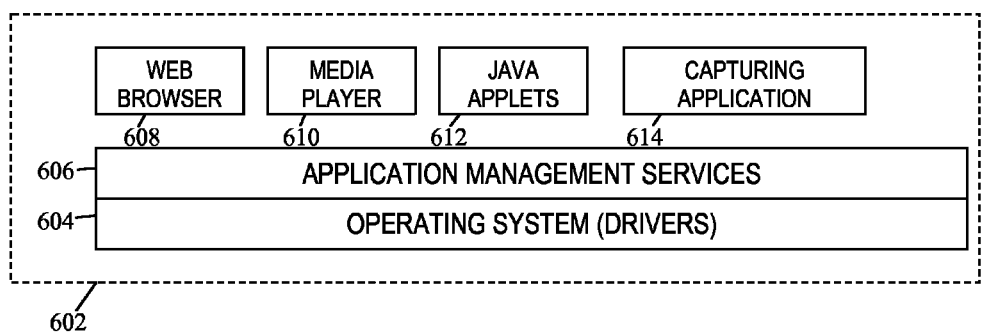
FIG. 6 is a block diagram of a software architecture for a mobile device according to an embodiment of the disclosure.

FIG. 6 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The capturing application 614 may correspond to the capturing application 120 provided by the system 100.

Figure 7:
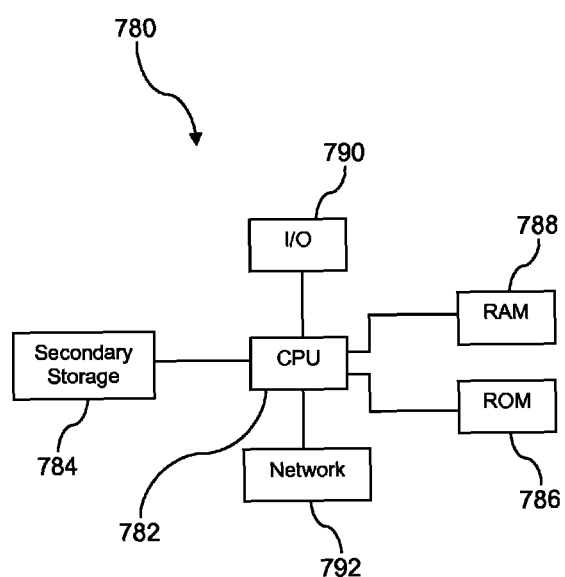
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/ or the ROM 786 may be referred to in some contexts as non-transitory storage and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 782 executes instructions, codes, computer programs, scripts which it accesses from hard disk, floppy disk, optical disk (these various disk based systems all may be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A portable electronic device, comprising:
   a processor;
   a memory; and
   a capturing application stored in the memory that, when executed on the portable electronic device,
      monitors a voice telephone call with another portable electronic device,
      records a telephone number spoken during the voice telephone call by a user of the other portable electronic device,
      sends a request message to the other portable electronic device, the request message containing the telephone number spoken during the voice telephone call and requesting confirmation of the telephone number,
      receives a confirmation message from the other portable electronic device, the confirmation message confirming the telephone number spoken during the voice telephone call, wherein confirming the telephone number comprises receiving a selection from the other portable electronic device, and
      provides the telephone number spoken during the voice telephone call to a user of the portable electronic device in response to the confirmation message.

2. The portable electronic device of claim 1, wherein the capturing application is activated one of prior to the beginning of the voice telephone call and during the voice telephone call.

3. The portable electronic device of claim 1, wherein the capturing application is activated by at least one of a voice command and a keypad entry into the portable electronic device.

4. The portable electronic device of claim 1, wherein the request message and the confirmation message are short message service (SMS) messages.

5. The portable electronic device of claim 1, wherein after the confirmation message is received, the portable electronic device queues the telephone number for originating a second voice telephone call by the portable electronic device.

6. The portable electronic device of claim 5, wherein after termination of the voice telephone call, the portable electronic device originates the second voice telephone call upon at least one of a second voice command and a second keypad entry into the portable electronic device.

7. The portable electronic device of claim 1, wherein when stored telephone number contained in the request message does not match the telephone number spoken during the voice telephone call, the other portable electronic device provides correction of the stored telephone number.

8. The portable electronic device of claim 7, wherein the other portable electronic device provides correction by at least one of sending a correction message containing the corrected telephone number in text format and providing the telephone number again in voice format one of during the voice telephone call and during a subsequent voice telephone call with the portable electronic device.

9. A processor-implemented method of capturing and storing telephone numbers from voice mail messages, comprising:
   receiving, by a portable electronic device, at least one of a spoken input and a keypad input during the playing of a voice mail message, wherein the voice mail message comprises a plurality of spoken telephone numbers;
   backing up, by the capturing application, the voice mail message a predetermined number of seconds from receiving the at least one of the spoken input and the keypad input to capture a portion of the voice mail message;
   analyzing, by the capturing application, the portion of the voice mail message to identify only the last telephone number spoken of the plurality of spoken telephone numbers in the voice mail message prior to the receipt of the at least one of the spoken input and the keypad input; and
   converting, by the capturing application, the last telephone number to text format and storing the last telephone number in the text format.

10. The method of claim 9, wherein receiving the at least one of the spoken input and the keypad input activates a conversion application executing on the portable electronic device.

11. The method of claim 9, further comprising storing, by the capturing application, the last telephone number, wherein the portable electronic device additionally associates a date stamp and a time stamp with the telephone number.

12. The method of claim 9, further comprising providing, by the capturing application, an option to record the last telephone number in an address book associated with the portable electronic device.

13. The method of claim 9, further comprising providing, by the capturing application, a selectable option associated with the stored telephone number, and initiating an outgoing voice telephone call using the stored telephone number.

14. The method of claim 9, further comprising extracting, recording, and converting, by the capturing application, multiple telephone numbers spoken in a single voice mail message to text, and associating tags with the multiple extracted telephone numbers to promote association of names with the telephone numbers.

15. A processor-implemented method of capturing and storing telephone numbers from voice telephone calls and voice mail messages, comprising:
   receiving, by a portable electronic device, at least one of a spoken entry and a keypad entry, the at least one entry activating a capturing application executing on the portable electronic device;
   recording, by the capturing application, a telephone number spoken into another portable electronic device during a voice telephone call by a user of the other portable electronic device;
   converting, by the capturing application, the telephone number to a text format;
   storing, by the capturing application, the converted telephone number;
   confirming, by the capturing application, the telephone number in the text format with the user of the other portable electronic device, wherein confirming the telephone number comprises receiving a selection from the other portable electronic device; and
   sending, by the capturing application, a message to a user of the portable electronic device in response to the confirming, the message containing the confirmed telephone number in the text format.

16. The method of claim 15, further comprises prompting the capturing application to confirm the telephone number by at least one of audible alert, visual alert, and vibration of the second portable electronic device.

17. The method of claim 15, further comprising storing the converted telephone number at least one of locally on the portable electronic device and in a remote storage device.

18. The method of claim 15, further comprising sending the message containing the confirmed telephone number to a party other than the user of the portable electronic device in response to an instruction entered into the portable electronic device.

19. The method of claim 15, wherein a capturing application additionally functions with spoken memorandum functionality provided by the portable electronic device, and wherein the user of the portable electronic device speaks a telephone number into the portable electronic device and a telephone call is not presently taking place.

20. The method of claim 15, wherein the capturing application is configurable to recognize spoken telephone numbers and associated information in a plurality of spoken languages.

* * * * *